United States Patent
Kawasaki et al.

(10) Patent No.: US 6,983,945 B2
(45) Date of Patent: Jan. 10, 2006

(54) VEHICLE BODY STRUCTURE

(75) Inventors: Satoshi Kawasaki, Kawachi-gun (JP);
Hiroshi Ito, Shioya-gun (JP);
Yoshitaka Sekiguchi, Kawachi-gun (JP); Tohru Ono, Kawachi-gun (JP);
Masaru Shibasawa, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/406,542

(22) Filed: Apr. 3, 2003

(65) Prior Publication Data

US 2003/0189334 A1 Oct. 9, 2003

(30) Foreign Application Priority Data

Apr. 8, 2002 (JP) .................................. 2002-105624

(51) Int. Cl.
*B60P 3/22* (2006.01)

(52) U.S. Cl. ........................................ 280/34; 280/830
(58) Field of Classification Search ......... 280/830–834; 180/291, 65.1, 65.2
See application file for complete search history.

(56) References Cited

U.S. PATENT DOCUMENTS

| | | | | |
|---|---|---|---|---|
| 3,983,952 A | * | 10/1976 | McKee | ....................... 280/778 |
| 4,371,181 A | * | 2/1983 | Monigold et al. | .......... 280/834 |
| 5,193,635 A | * | 3/1993 | Mizuno et al. | ............. 180/65.3 |
| 5,380,042 A | * | 1/1995 | Hively et al. | ................ 280/834 |
| 5,562,178 A | * | 10/1996 | Worden et al. | ............. 180/291 |
| 5,641,031 A | * | 6/1997 | Riemer et al. | ............. 180/65.3 |
| 5,673,939 A | * | 10/1997 | Bees et al. | .................... 280/831 |
| 6,257,360 B1 | * | 7/2001 | Wozniak et al. | ........... 180/69.5 |
| 6,293,590 B1 | * | 9/2001 | Ogasa | ......................... 280/834 |
| 6,378,637 B1 | * | 4/2002 | Ono et al. | .................. 180/65.3 |
| 6,481,751 B1 | * | 11/2002 | Davis et al. | ................. 280/831 |
| 6,648,085 B2 | * | 11/2003 | Nagura et al. | ............. 180/65.1 |
| 6,672,620 B2 | * | 1/2004 | Kawazu et al. | ............. 280/834 |
| 6,712,164 B2 | * | 3/2004 | Chernoff et al. | ........... 180/65.1 |
| 6,736,229 B1 | * | 5/2004 | Amori et al. | ................ 280/834 |

FOREIGN PATENT DOCUMENTS

| | | |
|---|---|---|
| JP | 9-300987 | 11/1997 |
| JP | 11-348815 | 12/1999 |

* cited by examiner

*Primary Examiner*—Lesley D. Morris
*Assistant Examiner*—L. Lum
(74) *Attorney, Agent, or Firm*—Merchant & Gould P.C.

(57) ABSTRACT

The disclosure relates to a vehicle body structure safeguarding a fuel tank from damage resulting from collisions without greatly increasing the weight of the vehicle. The vehicle body structure includes a front floor under which a fuel cell stack case accommodating a fuel cell stack is disposed, and side sills and floor frames which extend along the sides of the vehicle, and on which a sub-frame for housing a fuel tank is installed. The front face of the sub-frame and the rear face of the fuel cell stack case are flat and oppose each other.

2 Claims, 6 Drawing Sheets

VEHICLE BODY STRUCTURE

BACKGROUND OF THE INVENTION

1. Field of the Invention

The present invention relates to a vehicle body structure for a vehicle, such as a fuel cell vehicle, in which a fuel tank for storing a fuel gas, such as a hydrogen gas, is installed.

2. Description of the Related Art

Among automobiles, a fuel cell vehicle is known, in which electrical power is generated in a fuel cell by providing hydrogen as a fuel gas and oxygen as an oxidizing gas, and a motor is operated by the electrical power for driving the vehicle.

Among such fuel cell vehicles, a type of vehicle is known, in which a fuel tank for storing a hydrogen gas to be supplied to a fuel cell units is installed in the rear portion of the vehicle.

An example of a body structure, in which a fuel tank is supported in the rear portion of the vehicle as described above, is disclosed in Japanese Unexamined Patent Application, First Publication No. Hei 09-300987. In this supporting structure, a fuel tank storing a fuel gas (hydrogen) is mounted in a chassis frame having a rectangular frame shape while the upside of the fuel tank is directed upward, and the chassis frame supporting the fuel tank is mounted on a body frame from beneath the body frame.

According to such a structure, because the fuel tank can be easily mounted on the body frame along with suspension parts for both sides and other elements, productivity may be increased, and production cost may be reduced. In addition, by installing the fuel tank, suspension parts for both sides, and other elements on the chassis frame, the size and weight of the vehicle may be reduced.

However, in the conventional body structure described above, in order to protect the fuel tank by the chassis frame, the strength and rigidity of the chassis frame must be increased by, for example, increasing thickness of material for forming the chassis frame, or by adding reinforcements to the chassis frame, and as a result, problems are encountered in that the vehicle weight is increased, and consequently, fuel efficiency is degraded.

Another proposal has been made in Japanese Unexamined Patent Application, First Publication No. Hei 11-348815, in which an upper frame is formed so as to include a curved portion, and lower frames are configured in parallel to each other so as to absorb the energy at a rear collision; however, the performance is not satisfactory.

SUMMARY OF THE INVENTION

In consideration of the above circumstances, an object of the present invention is to provide a vehicle body structure which greatly improves safety of a fuel tank against collision without greatly increasing vehicle weight.

In order to achieve the above object, the present invention provides a vehicle body structure comprising: a front floor under which a fuel cell stack case, accommodating a fuel cell stack, is disposed; and side sills and floor frames which extend along the sides of the vehicle, and on which a sub-frame having a fuel tank is installed, wherein the front face of the sub-frame and the rear face of the fuel cell stack case are formed to be flat and oppose each other.

According to the above structure of the present invention, when a load is applied to the sub-frame, the load is distributed to the side sills and floor frames from the sub-frame, and thus the load is received by the entirety of the body. In addition, even when the sub-frame is moved forward, the front face of the sub-frame abuts against the rear face of the fuel cell stack case which is disposed in front of the sub-frame while being disposed under the front floor, and as result, the load is distributed over the entirety of flat surfaces.

DESCRIPTION OF THE PREFERRED EMBODIMENTS

An embodiment of the present invention will be explained below with reference to FIGS. 1 to 5.

Figure 1:
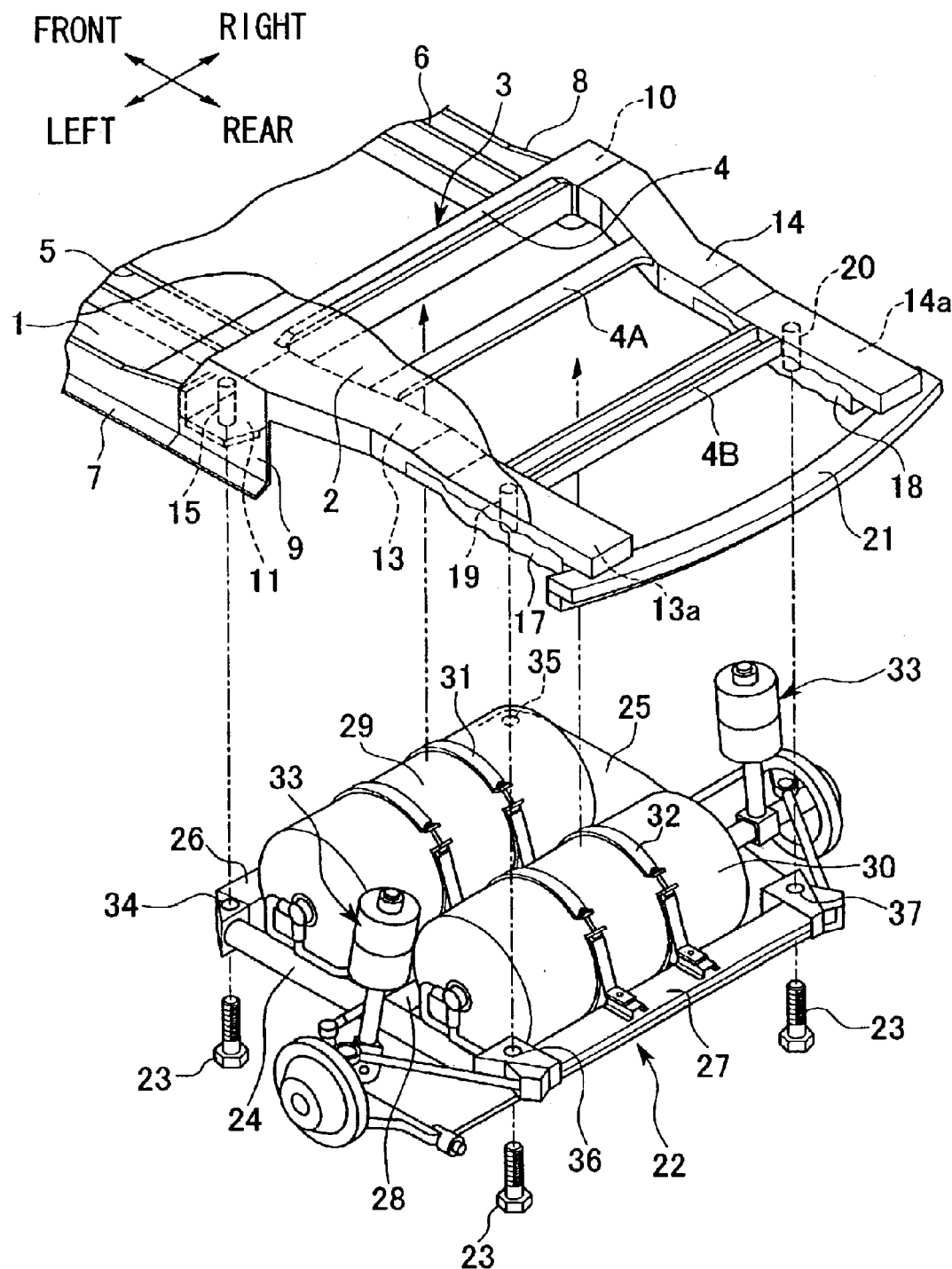
FIG. 1 is an exploded perspective view showing an embodiment of the present invention.

As shown in FIG. 1, a rear floor 2, which is formed so as to be bent backward and upward, and so as to include steps, is connected to the rear edge of a front floor 1. A cross member 4, which is a part of a main skeletal structure of the vehicle body, is connected to the underside of a stepped portion 3 of the rear floor 2. Under the front floor 1, there are provided floor frames 5 and 6 which are parts of the main skeletal structure, and which extend along the sides of the vehicle body.

Inside sills 7 and 8 are connected to the side edges of the front floor, respectively, and inside sill extensions 9 and 10 are connected to the rear ends of the inside sills 7 and 8, respectively. The inside sills 7 and 8 are connected to outside sills (not shown), respectively, to form a part of the main skeletal structure of the vehicle body.

Figure 6:
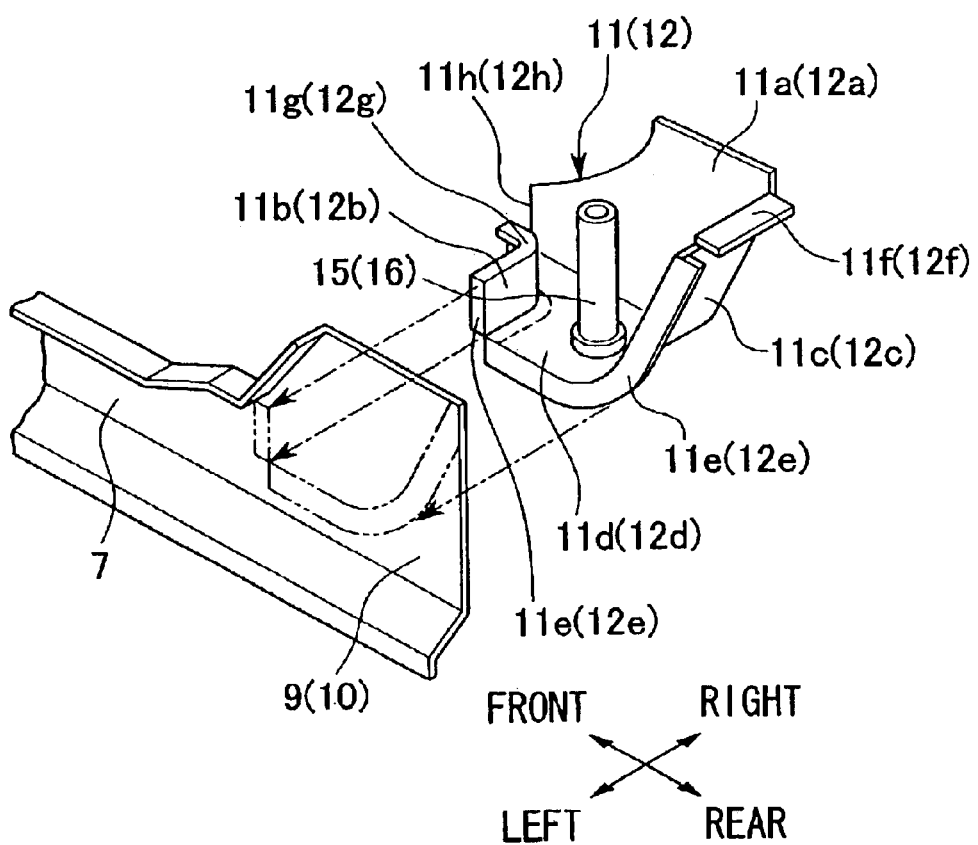
FIG. 6 is a perspective view showing a front bracket in the embodiment shown in FIG. 1.

As shown in FIG. 6, front brackets 11 and 12 are connected to the inside surface of the inside sill extensions 9 and 10, respectively (FIG. 6 shows only left elements).

The front brackets 11 and 12 respectively comprise inner walls 11a and 12a, front walls 11b and 12b, rear walls 11c and 12c, bottom walls 11d and 12d, flanges 11e and 12e which are disposed on the outer edges of the front brackets 11 and 12 to be connected to the inside sill extensions 9 and 10, flanges 11f and 12f which are disposed on the upper edges of the rear walls 11c and 12c to be connected to the bottom walls 13a and 14a of rear frames 13 and 14, which will be explained below, and flanges 11g and 12g which are disposed on the upper edges of the front walls 11b and 12b to be connected to the underside of the cross member 4. In addition, the front walls 11b and 12b extend forwardly along with the inner walls 11a and 12a to respectively form connection portions 11h and 12h which are to be connected to the floor frames 5 and 6. The inner walls 11a and 12a are formed to be connected to the side walls of the rear frames 13 and 14, respectively. In the bottom walls 11d and 12d, there are provided vertically extending collar nuts 15 and 16, respectively.

The rear frames 13 and 14 are connected to the underside of the rear floor 2 to form a part of the main skeletal structure of the vehicle body.

The bottom walls 13a and 14a of the rear frames 13 and 14 are connected to the rear walls 11c and 12c of the front brackets 11 and 12, which are configured as explained above, and the side walls of the rear frames 13 and 14 are connected to the inner walls 11a and 12a, respectively. The inner walls of the inside sill extensions 9 and 10 are respectively connected to the flanges 11e and 12e, which are disposed on the outer edges of the front brackets 11 and 12. The rear ends of the floor frames 5 and 6 are connected to the connection portions 11h and 12h. As a result, the front ends of the rear frames 13 and 14 are connected to the inside sills 7 and 8, as well as to the floor frames 5 and 6 via the front brackets 11 and 12, respectively.

Figure 7:
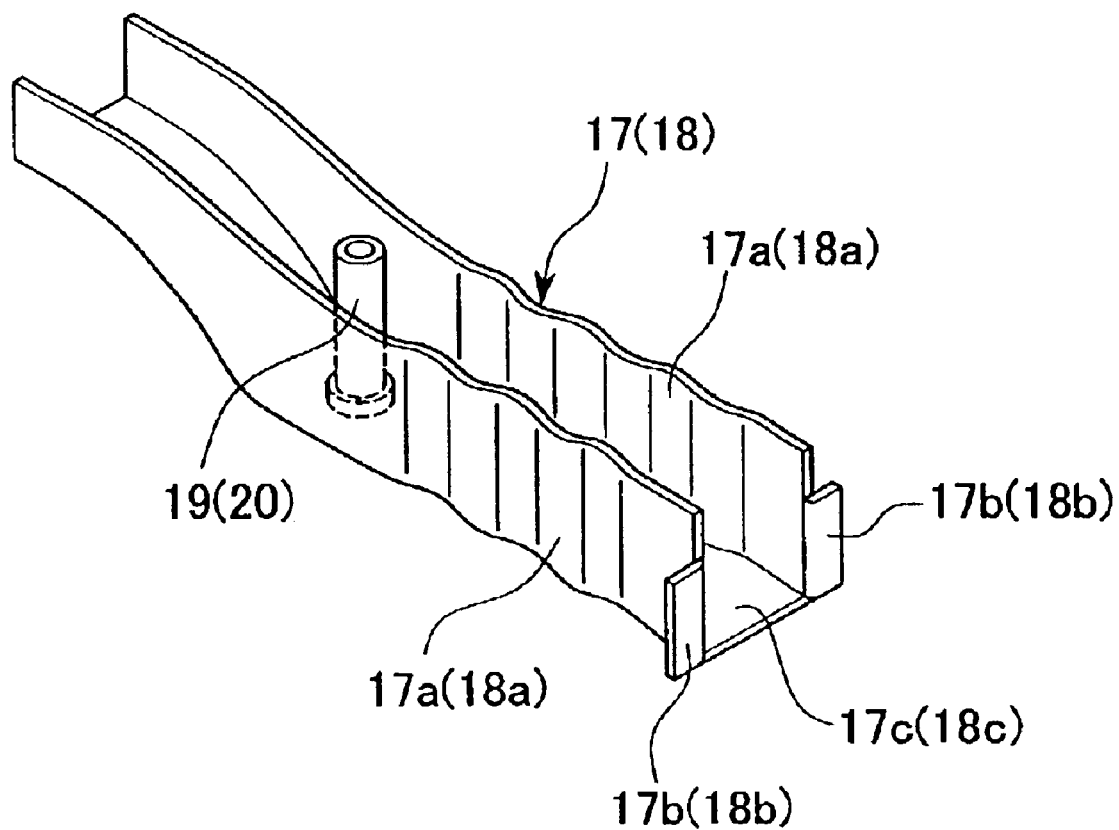
FIG. 7 is a perspective view showing a rear bracket in the embodiment shown in FIG. 1.

Rear brackets 17 and 18, which have substantially U-shaped cross sections as shown in FIG. 7 (only left rear bracket 17 is shown), are connected to the undersides of the rear ends of the rear frames 13 and 14, respectively. Each of the rear brackets 17 and 18 comprises two side walls 17a (or 18a), which act to absorb collisional energy, and two flanges 17b (or 18b) connected to the rear ends of the side walls 17a (or 18a). The inner surfaces of the side walls 17a (or 18b) are connected to the outer surfaces of the side walls of the rear frame 13 (or 14). In a bottom wall 17c (or 18c) of the rear bracket 17 (or 18), specifically in the front portion thereof, there is provided a vertically extending collar nut 19 (or 20).

Figure 2:
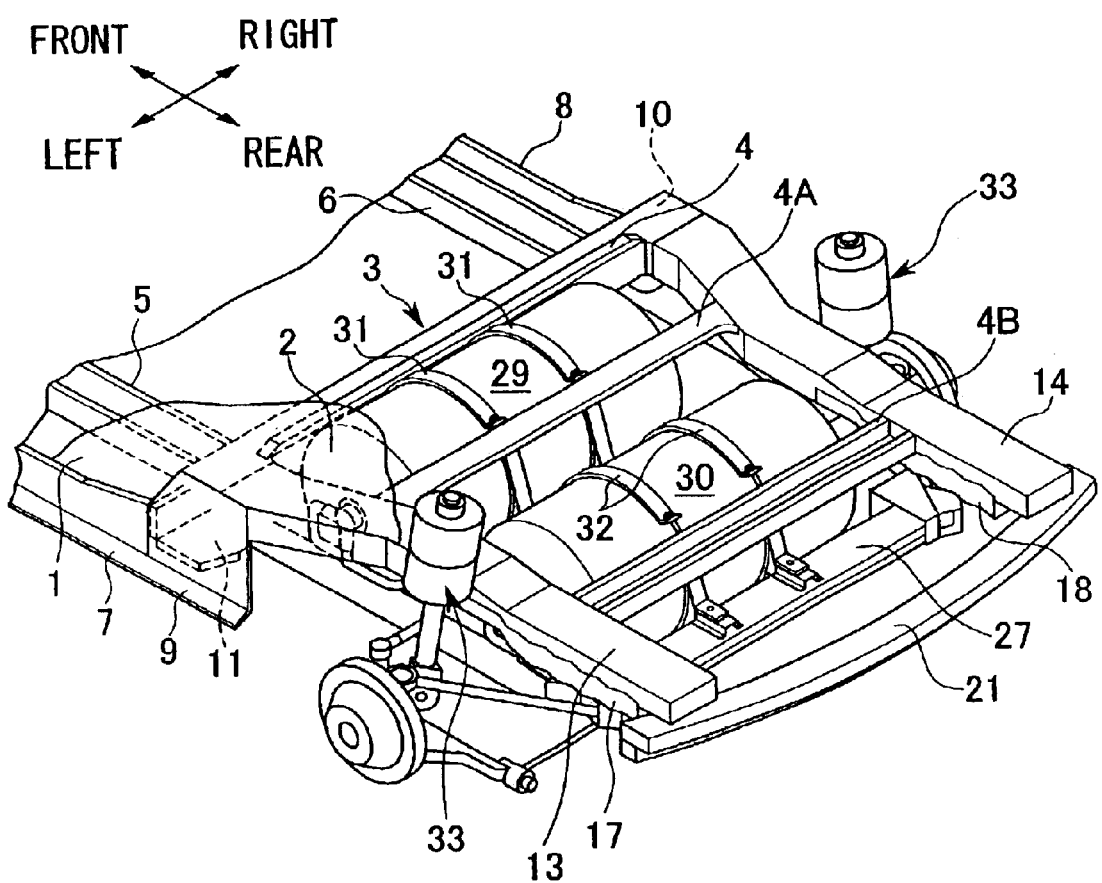
FIG. 2 is a perspective view showing the embodiment shown in FIG. 1 in an assembled state.

As shown in FIGS. 1 and 2, two cross members 4A and 4B, which are disposed in the longitudinal direction with respect to each other while extending laterally, are connected to the rear frames 13 and 14 while being disposed there between. A bumper beam 21 is disposed at the rear ends of the rear frames 13 and 14, and more specifically, the bumper beam 21 is connected to the flanges 17b and 18b of the rear brackets 17 and 18.

The sub-frame 22 is fixed, from underneath the vehicle body, to the collar nuts 15 and 16 of the front brackets 11 and 12, and to the collar nuts 19 and 20 of the rear brackets 17 and 18 using four bolts 23.

As shown in FIG. 1, the sub-frame 22 is formed by lateral frame members 24 and 25, and by longitudinal members 26 and 27 in a rectangular frame shape. The sub-frame 22 further comprises a cross beam 28 extending laterally. In two spaces partitioned by the cross beam 28, two hydrogen tanks 29 and 30 as fuel tanks are disposed and fixed by tightening bands 31 and 32, respectively. In addition, suspension units 33 are mounted on the sub-frame 22.

At the corners of the sub-frame 22, where the front ends of the lateral frame members 24 and 25 and the two ends of the front frame member 26 meet, there are provided through holes 34 and 35, respectively, into which the bolts 23 to be engaged with the collar nuts 15 and 16 are inserted. At the corners of the sub-frame 22, where the rear ends of the lateral frame members 24 and 25 and the two ends of the rear frame member 27 meet, there are provided through holes 36 and 37, respectively, into which the bolts 23 to be engaged with the collar nuts 19 and 20 are inserted.

The sub-frame 22 configured as explained above is fixed to the rear frames 13 and 14 in such a manner that the bolts 23 are inserted into the through holes 34, 35, 36, and 37, and the bolts 23 are further inserted into the collar nuts 15 and 16 of the front brackets 11 and 12, and into the collar nuts 19 and 20 of the rear brackets 17 and 18, and then the bolts 23 are tightened. The front frame member 26 of the sub-frame 22 includes a flat surface 26a.

Figure 3:
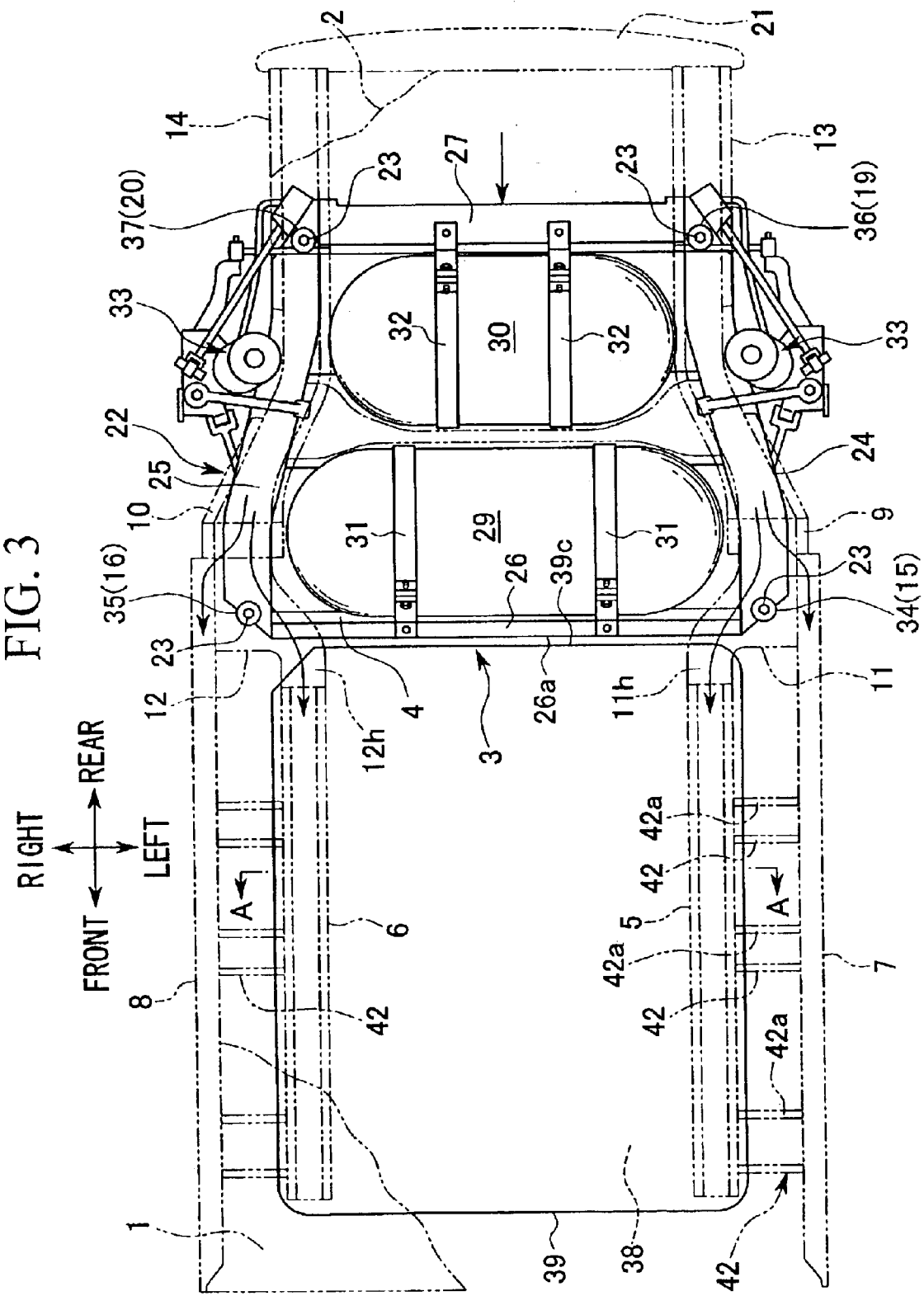
FIG. 3 is a plan view showing the embodiment in the assembled state.
Figure 4:
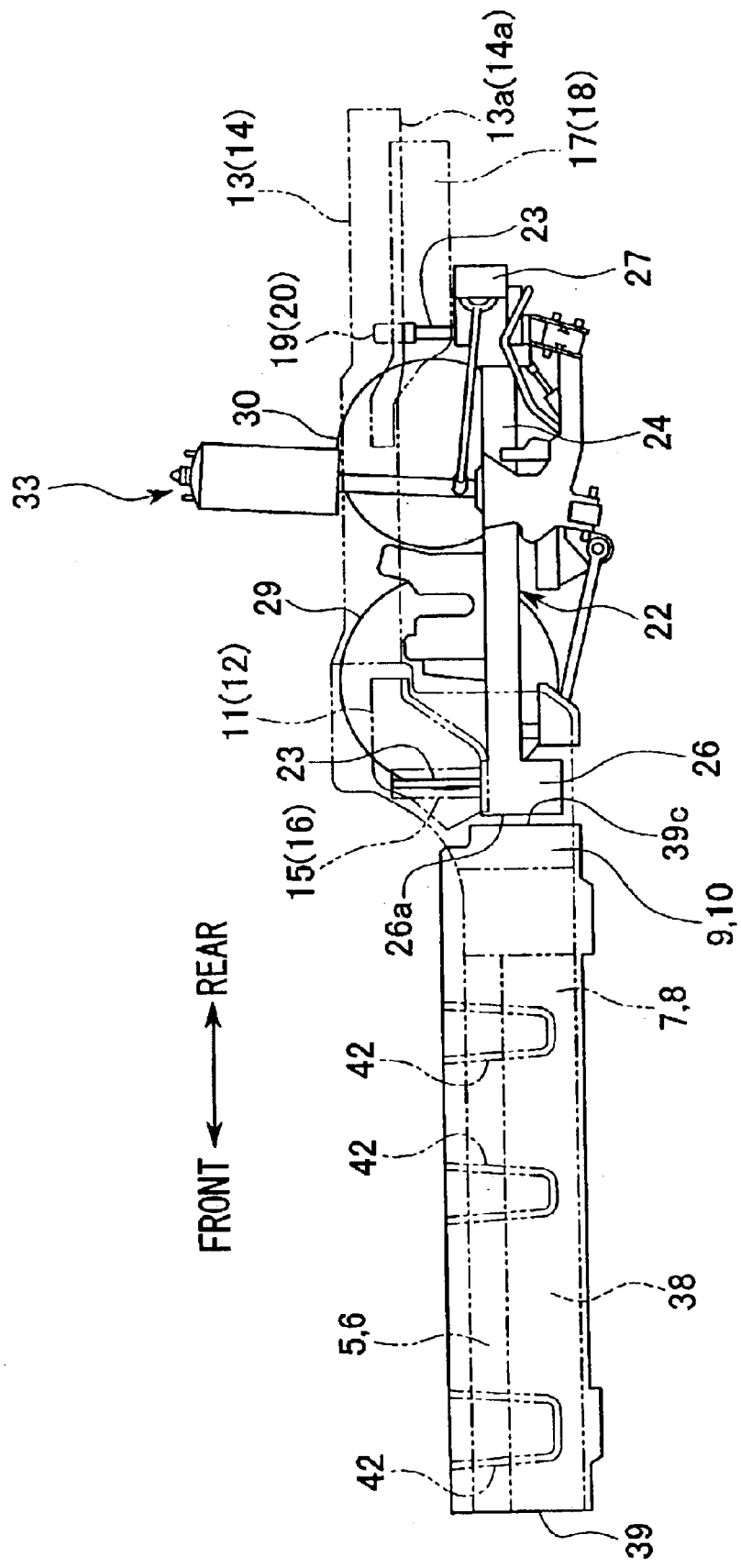
FIG. 4 is a side view showing the embodiment in the assembled state.
Figure 5:
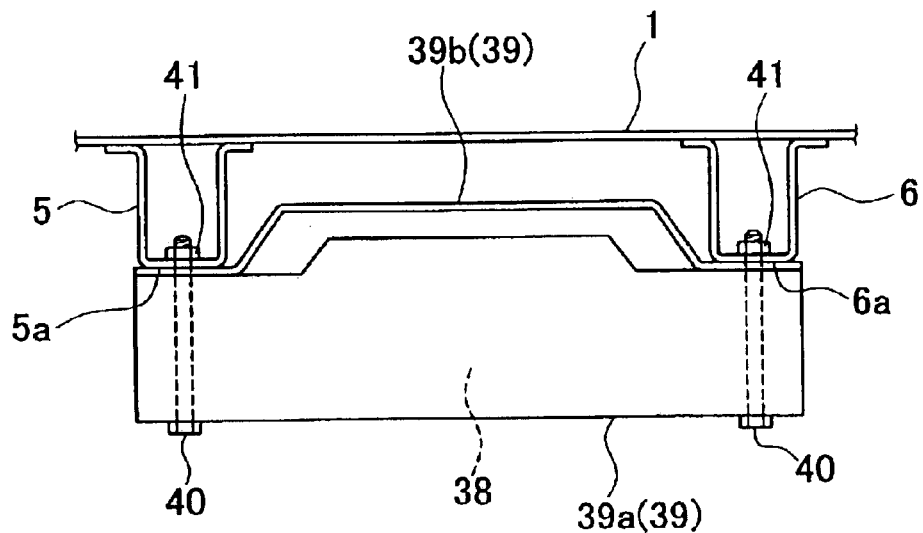
FIG. 5 is a cross-sectional view taken along the line A—A in FIG. 3.

As shown in FIGS. 3 to 5, a fuel cell stack case 39 accommodating a fuel cell 38 is disposed under the front floor 1 so as to extend from the floor frame 5 to the floor frame 6. A hydrogen gas supplied from the hydrogen tanks 29 and 30, and oxygen contained in air supplied from a compressor (not shown) react in the fuel cell 38 to As shown in FIG. 5, the fuel cell stack case 39 comprises a case body 39a for receiving the fuel cell 38, and a cover 39b disposed on the case body 39a. The case body 39a is formed so as to have a convex portion in the upper portion thereof, and the cover 39b includes a concave portion to accommodate the convex portion of the case body 39a. The case body 39a and the cover 39b are fixed to the bottom walls 5a and 6a of the floor frames 5 and 6 in such a manner that bolt 40 are engaged with nuts 41 from beneath the vehicle body, and the bolts 40 are tightened. The rear face of the fuel cell stack case 39, i.e., the rear face of the case body 39a, is formed as a flat surface 39c as shown in FIG. 3. A treatment device, which must be provided with the fuel cell 38 for treating residual gases and condensed water after reaction, may be preferably disposed in the vicinity of the rear portion of the fuel cell stack case 39.

The flat surface 39c of the fuel cell stack case 39 configured as explained above is disposed so as to oppose the front flat surface 26a of the sub-frame (i.e., of the front member 26).

As shown in FIGS. 3 and 4, between the floor frame 5 and the inside sill 7, and between the floor frame 6 and the inside sill 8, there are provided three brackets 42 in one side, i.e., six brackets 42 in both sides, so as to connect the floor frames 5 and 6 and the inside sills 7 and 8, respectively. Each of the brackets 42 comprises flanges 42a to be connected to the floor frame 5 (or 6), to the inside sill 7 (or 8), and to the underside of the front floor 1.

According to the above embodiment, when, for example, a load is applied to the bumper beam 21 disposed at the rear ends of the rear frames 13 and 14, the load is distributed to the inside sills 7 and 8, and to the floor frames 5 and 6 via the front brackets 11 and 12. As a result, because a heavy load is not applied to the sub-frame 22, the hydrogen tanks 29 and 30 can be reliably protected.

Moreover, because the front portion of the sub-frame 22 is connected to the front brackets 11 and 12 via the collar nuts 15 and 16, and the inside sills 7 and 8 disposed the inner side of the vehicle and the floor frames 5 and 6 disposed outer side of the vehicle are connected to the front brackets 11 and 12, respectively, and when, for example, an impact load is forwardly applied to the rear portion of the sub-frame 22 as shown by the arrow in FIG. 3, the impact load is divided into two through the front brackets 11 and 12, and the divided loads are distributed to the inside sills 7 and 8, and to the floor frames 5 and 6.

Accordingly, the supportable load of the vehicle body may be increased by the amount distributed to both inside sills 7 and 8, and the floor frames 5 and 6 if compared with the case in which a load is supported merely by either of the inside sills 7 and 8, or the floor frames 5 and 6 in a concentrated manner. Moreover, the impact load is applied to the inside sills 7 and 8, and the floor frames 5 and 6 in compressive directions, which is preferable in terms of strength.

As a result, the hydrogen tanks 29 and 30 installed on the sub-frame 22 can be reliably protected.

Furthermore, when an impact load is forwardly applied to the sub-frame 22 as described above, and even when the sub-frame 22 is moved forward, because the flat surface 26a of the front frame member 26 of the sub-frame 22 is disposed so as to oppose the flat surface 39*c* of the rear face of the fuel cell stack case 39, and because the flat surface 26*a* of the sub-frame 22 transmits the impact load uniformly to the entirety of the flat surface 39*c* of the fuel cell stack case 39, the impact load is distributed over the entirety of the flat surface 39*c* of the fuel cell stack case 39; therefore, the fuel cell stack case 39 can be reliably prevented from being broken in contrast to the case in which the impact load is applied to a portion of the rear face of the fuel cell stack case 39 in a concentrated manner.

Moreover, because the movement of the flat surface 26*a* of the sub-frame 22 is restrained by the flat surface 39*c* of the fuel cell stack case 39, the deformation of the rear floor 2 at the stepped portion 3 is also restrained; therefore, the deformation of the rear floor 2 at the stepped portion 3 can be minimized.

If the treatment device for treating residual gases or the like after reaction is disposed in the vicinity of the rear portion of the fuel cell stack case 39 as mentioned above, the treatment device may function to restrain the forward movement of the sub-frame 22; therefore, safety performance may further be improved.

As explained above, when an impact load is forwardly applied to the sub-frame 22, the impact load is distributed to the inside sills 7 and 8, and in the floor frames 5 and 6 through the front brackets 11 and 12. Even when the sub-frame 22 is moved forward, the flat surface 26*a* of the sub-frame 22 is supported by the flat surface 39*c* of the fuel cell stack case 39; therefore, the deformation of the entire vehicle body including the sub-frame 22 may be minimized.

As a result, safety of the hydrogen tanks 29 and 30 against collision can be greatly improved without adding reinforcements to the frame or body, and thus without a great increase in vehicle weight.

Advantageous Effects Obtainable by the Invention

As described above, according to the present invention, a load applied to the sub-frame is received by the side sills and the floor frames in a dissipated manner, and when the sub-frame is moved forward, the front flat surface of the sub-frame is uniformly supported by the rear flat surface of the fuel cell stack case; therefore, the strength and rigidity of the vehicle body against an aft-to-fore impact load may be increased.

What is claimed is:

1. A vehicle body structure comprising:

a front floor under which a fuel cell stack case accommodating a fuel cell stack is disposed; and floor frames which extend along sides of the vehicle, the floor frames comprise: front lower portions which are disposed under the front floor, and to which the fuel cell stack case is fixed; rear upper portions under which a sub-frame having a fuel tank is installed so that a front face of the sub-frame and a rear face of the fuel cell stack case, both of which are formed to be flat, oppose each other; and stepped portions, which connect the front lower portions to the rear upper portions.

2. A vehicle body structure comprising:

a front floor;

a fuel cell stack case positioned under the front floor, the fuel cell stack case including a flat rear face;

floor frames which extend along sides of the vehicle, the floor frames comprising:
front lower portions coupled to the fuel cell stack case,
rear upper portions,
step portions connecting the front lower portions and the rear upper portions,
a sub-frame being positioned under the rear upper portions and constructed to support a fuel tank, the sub-frame including a flat front face opposite the flat rear face of the fuel cell stack case.

* * * * *